(12) United States Patent
Nawrocki et al.

(10) Patent No.: US 12,458,343 B2
(45) Date of Patent: Nov. 4, 2025

(54) BARBED SUTURE WITH REMOVABLE SHEATH

(71) Applicant: Cilag GmbH International, Zug (CH)

(72) Inventors: Jesse G. Nawrocki, Annandale, NJ (US); Robert J. Tannhauser, Bridgewater, NJ (US); Leo B. Kriksunov, Ithaca, NY (US)

(*) Notice: Subject to any disclaimer, the term of this patent is extended or adjusted under 35 U.S.C. 154(b) by 252 days.

(21) Appl. No.: 17/991,988

(22) Filed: Nov. 22, 2022

(65) Prior Publication Data

US 2024/0164769 A1    May 23, 2024

(51) Int. Cl.
A61B 17/04    (2006.01)
A61B 17/06    (2006.01)

(52) U.S. Cl.
CPC .... *A61B 17/0493* (2013.01); *A61B 17/06066* (2013.01); *A61B 17/06166* (2013.01); *A61B 2017/0608* (2013.01); *A61B 2017/0609* (2013.01); *A61B 2017/06171* (2013.01); *A61B 2017/06176* (2013.01); *A61B 2017/0618* (2013.01)

(58) Field of Classification Search
CPC ......... A61B 17/06166–06195; A61B 17/0493; A61B 2017/0608; A61B 2017/00336; A61B 17/0482
USPC ....................................................... 606/228
See application file for complete search history.

(56) References Cited

U.S. PATENT DOCUMENTS 5,342,376 A * 8/1994 Ruff ................. A61B 17/06109
606/228
5,382,257 A * 1/1995 Lewis ................ A61B 17/0401
606/224

(Continued)

FOREIGN PATENT DOCUMENTS

CN     214318069 U    10/2021
CN     214907491 U    11/2021
EP       1959840 B1    2/2012

OTHER PUBLICATIONS

Cook Medical, Elevo® Snoring Intervention Set, Brochure, Sep. 2019, accessed from https://www.cookmedical.com/products/205b8629-8d05-4388-be18-4b359b3a5feb/, 7 pgs.

(Continued)

*Primary Examiner* — Kathleen S Holwerda
*Assistant Examiner* — Serenity A Miller
(74) *Attorney, Agent, or Firm* — Amir Bishara

(57) ABSTRACT

A single-armed suture assembly includes a needle, a flexible suture, and a flexible sheath. The flexible suture is coupled with the needle. The flexible suture includes first and second portions. The first portion includes a plurality of first barbs having first tips extending away from the longitudinal path in either an insertion direction or in a counter insertion direction that is opposite to the insertion direction. The second portion includes a plurality of second barbs having second tips extending opposite to the first tips. The flexible sheath is configured to prevent one of the first or second tips that extend in the insertion direction from contacting tissue as the flexible sheath is being advanced in the insertion (Continued)

direction. The other of the first or second tips that extend in the counter insertion direction is configured to contact tissue as the flexible sheath is being advanced in the insertion direction.

20 Claims, 8 Drawing Sheets

(56) References Cited

U.S. PATENT DOCUMENTS

| | | | |
|---|---|---|---|
| 8,663,277 B2 | 3/2014 | Collier et al. | |
| 9,125,647 B2 | 9/2015 | Goraltchouk et al. | |
| 10,548,592 B2 | 2/2020 | Ruff et al. | |
| 10,595,985 B2 | 3/2020 | Lee et al. | |
| 11,135,083 B2 | 10/2021 | Dillard | |
| 2005/0251210 A1* | 11/2005 | Westra | A61B 17/0469 606/232 |
| 2008/0281338 A1 | 11/2008 | Wohlert et al. | |
| 2009/0044814 A1* | 2/2009 | Iancea | A61B 17/06109 623/23.72 |
| 2009/0143819 A1 | 6/2009 | D'Agostino | |
| 2009/0248066 A1* | 10/2009 | Wilkie | A61B 17/06166 606/228 |
| 2009/0287245 A1* | 11/2009 | Ostrovsky | A61B 17/06166 606/228 |
| 2021/0393432 A1 | 12/2021 | Dillard | |

OTHER PUBLICATIONS

Cook Medical, Elevo® Snoring Intervention Set, Datasheet, Nov. 2019, accessed from https://www.cookmedical.com/products/205b8629-8d05-4388-be18-4b359b3a5feb/, 2 pgs.
International Search Report and Written Opinion dated Feb. 27, 2024, for International Application No. PCT/IB2023/061741, 17 pages.

* cited by examiner

BARBED SUTURE WITH REMOVABLE SHEATH

BACKGROUND

Bi-directional knotless sutures may provide advantages for tissue fixation. Bi-directional means that the suture includes barbs facing in opposite directions. Knotless means that the suture does not have a knot at a terminal end of the suture to maintain the desired placement of the suture within the tissue. However, the use of dual-armed bi-directional knotless sutures may be difficult in some circumstances (e.g., in tight spaces). Dual armed means having only two suture needles attached to the suture (e.g., one needle at each end of the suture). In some instances, a rigid hollow introducer is used to deliver bi-directional barbed sutures. The rigid hollow introducer may use a sharpened tissue-piercing tip to contain and protect the barbed suture or at least a portion of the barbed suture, so that the barbs oriented against the direction of suture insertion can be inserted into tissue. However, rigid hollow introducers may utilize relatively large tissue openings to install the suture. Additionally, the rigidity of the rigid hollow introducers may result in a pre-set suture positioning corresponding to the shape of the rigid hollow introducer.

There is a need for a bi-directional knotless suture that is single armed (i.e., having only one suture needle attached at one end of the knotless suture). Additionally, there is a need for a bi-directional knotless suture that is flexible and installable along various tissue fixation and closure paths. Additionally, there is a need for a bi-directional knotless suture that does not incorporate a rigid hollow introducer to reduce the size of the opening in the tissue and/or reduce the amount of tissue trauma.

While various barbed sutures and methods of using barbed sutures have been made and used, it is believed that no one prior to the inventors has made or used the invention described in the appended claims.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1:
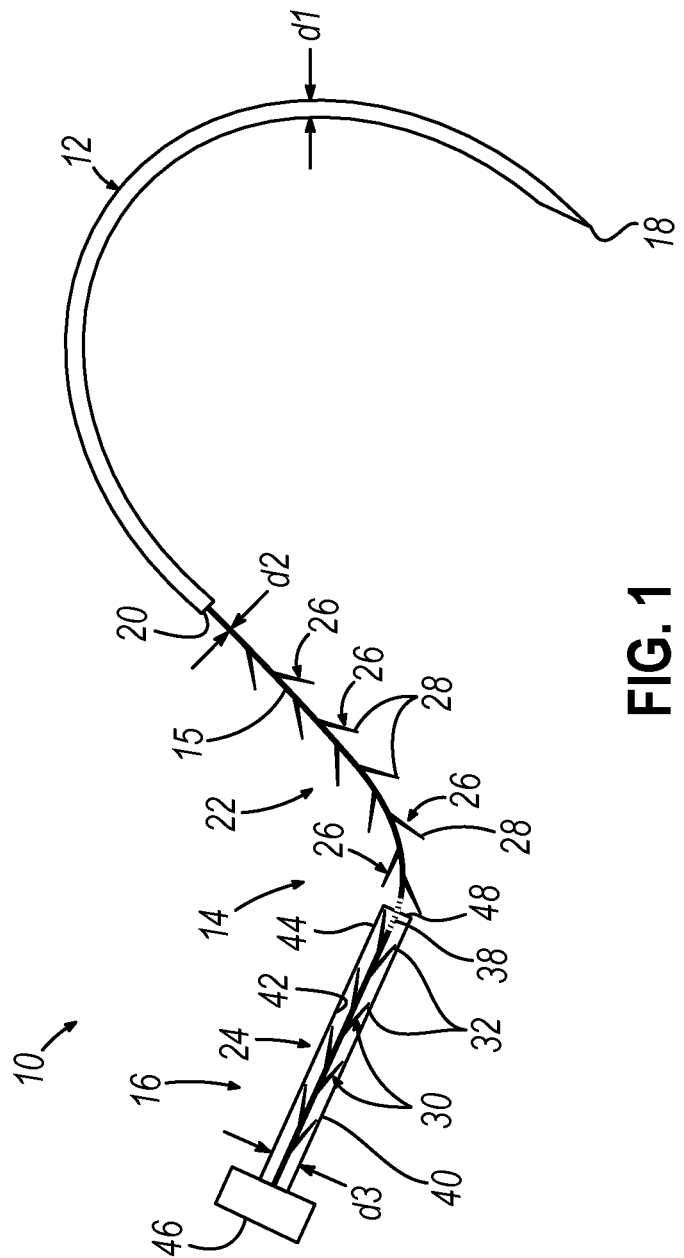
FIG. 1 depicts a side elevational view of a first example of a single-armed suture assembly.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It will be further appreciated that, for convenience and clarity, spatial terms such as "longitudinally," also are used herein for reference to relative positions and directions. Such terms are used below with reference to views as illustrated for clarity and are not intended to limit the invention described herein.

Furthermore, the terms "about," "approximately," and the like as used herein in connection with any numerical values or ranges of values are intended to encompass the exact value(s) referenced as well as a suitable tolerance that enables the referenced feature or combination of features to function for the intended purpose described herein.

I. Examples of Barbed Sutures with Removable Sheaths

A. First Example of a Single-Armed Suture Assembly

Figure 2A:
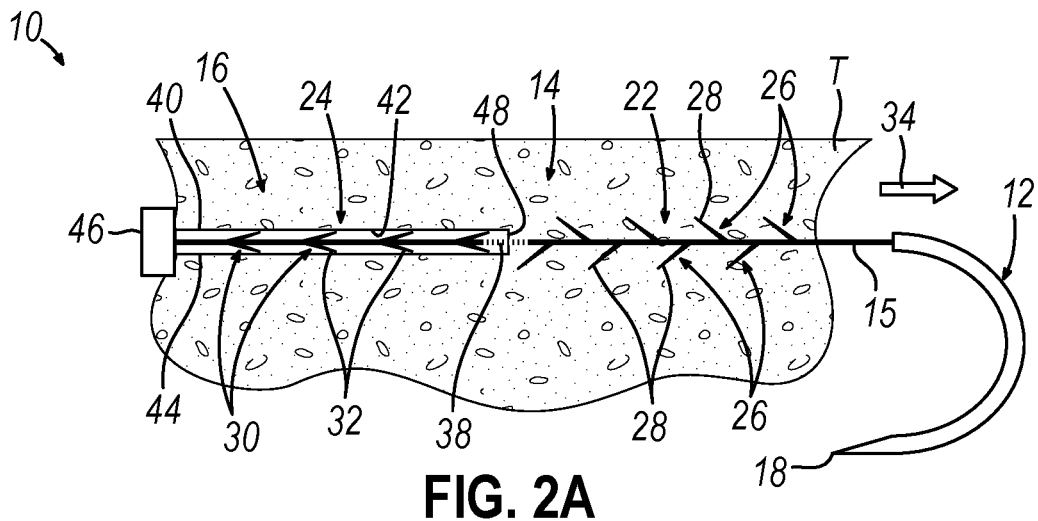
FIG. 2A depicts a side elevational view of the single-armed suture assembly of FIG. 1 after being advanced through tissue in an insertion direction with a flexible sheath covering select barbs of a flexible suture of the single-armed suture assembly.
Figure 2B:
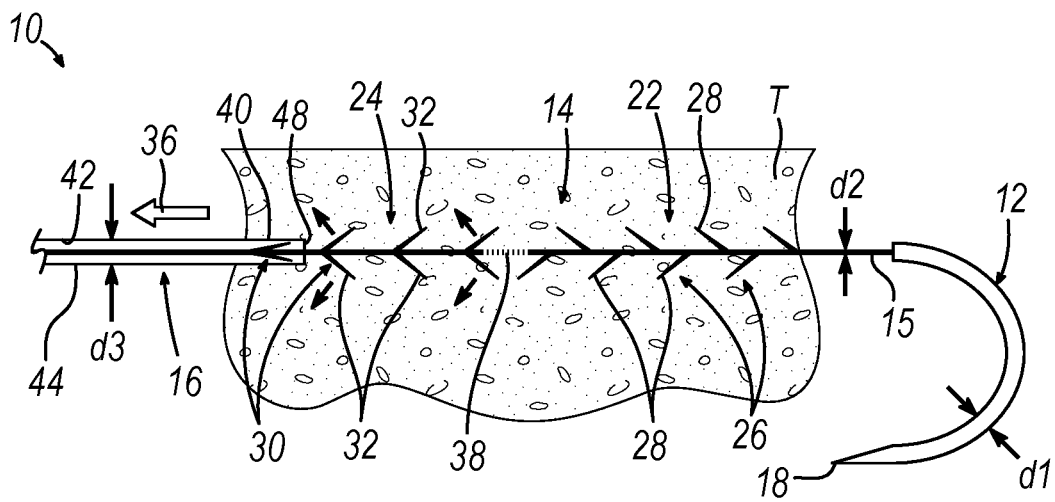
FIG. 2B depicts a side elevational view of the single-armed suture assembly of FIG. 2A, but with the flexible sheath being removed in a counter insertion direction to expose the previously covered barbs.
Figure 2C:
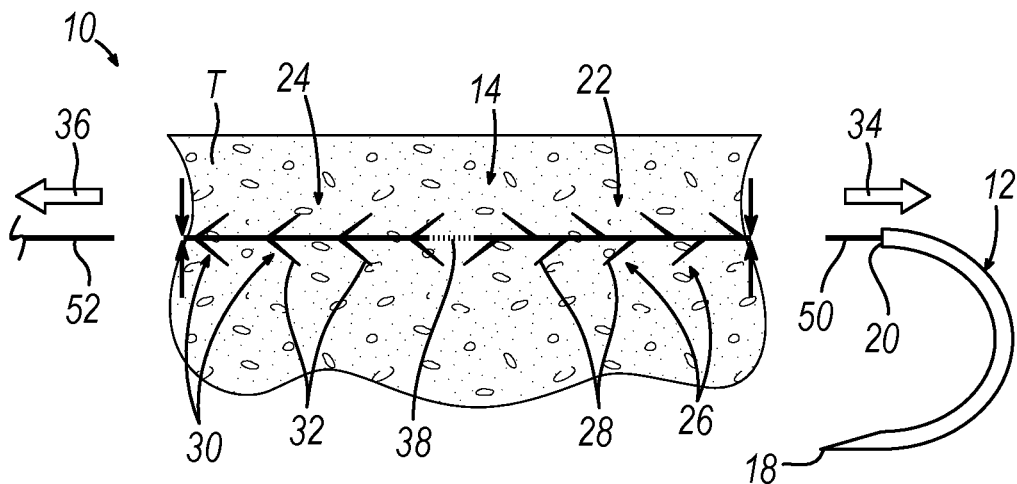
FIG. 2C depicts a side elevational view of the single-armed suture assembly of FIG. 2B, but with cut portions of the flexible suture being removed.

FIGS. 1-2C show a first example of a single-armed suture assembly (10). Single-armed suture assembly (10) is shown as a single armed bi-directional barbed or knotless suture. As shown, single-armed suture assembly (10) includes a needle (12), a flexible suture (14), and a flexible sheath (16).

Needle (12) includes first and second ends (18, 20). As shown, first end (18) is sharp and is configured to pierce tissue (T) in an insertion direction (34). Second end (20) is configured to be advanced through tissue (T) in insertion direction (34) based on the path already traveled by first end (18). While needle (12) is shown as a curved needle, other types of needles are also envisioned including a straight needle (see FIGS. 7-8) or a bendable needle. For a curved needle, first and second ends (18, 20) may be arranged at different angles, with about a 180-degree angle being shown between first and second ends (18, 20). As shown in FIGS. 1 and 2B, needle (12) has a needle diameter (d1), defining a cross-sectional thickness, that is greater than a diameter (d2) of flexible suture (14). In some versions, needle (12) may be rigid or substantially rigid. In some versions, needle (12) may be formed from metallic material (e.g., stainless steel) and/or a polymeric material.

Flexible suture (14) is coupled with second end (20) of needle (12). Flexible suture (14) is shown as a knotless suture. Flexible suture (14) extends along a path (15), which may be straight or curved. For example, flexible suture (14) may extend along a helical path. Flexible suture (14) includes first and second portions (22, 24), which may be same or different size. Additionally, first and second portions (22, 24) may include the same or different number of barbs. As shown, first portion (22) is disposed closer to needle (12) than second portion (24). First portion (22) includes a plurality of first barbs (26) having first tips (28) extending away from path (15) in either insertion direction (34) or in a counter insertion direction (36). Counter insertion direction (36) is about 180 degrees opposite to insertion direction (34). As shown, first tips (28) of first barbs (26) each extend away from path (15) in counter insertion direction (36). In other words, first tips (28) extend more towards counter insertion direction (36) than insertion direction (34). First tips (28) are configured to provide minor or no resistance against flexible suture (14) moving in tissue (T) following needle (12) during installation. For example, first tips (28) may deflect toward path (15) as first tips (28) advance through tissue (T) in insertion direction (34).

Second portion (24) includes a plurality of second barbs (30) having second tips (32) extending opposite to first tips (28) in other of insertion direction (34) or counter insertion direction (36). In other words, first and second barbs (26, 30) are bidirectional. In this example, second barbs (30) may also be referred to as counter barbs. As shown, second tips (32) each extend away from path (15) in insertion direction (34). In other words, second tips (32) extend more towards insertion direction (34) than counter insertion direction (36). Second tips (32) of second barbs (30) are directed against insertion direction (34) of flexible suture (14) and towards needle (12). Second tips (32) are covered by flexible sheath (16) during the installation of single-armed suture assembly (10). In other words, second portion (24) containing the counter barbs is enveloped or covered by a thin, tubular, removable flexible sheath (16) that is covering each counter barb. Should second tips (32) be uncovered during installation, second tips (32) would provide resistance against flexible suture (14) moving in insertion direction (34) within tissue (T). In some versions, the counter barb containing suture portion has a diameter that is less that the diameter or effective cross-section of the portion containing regular (non-counter) barbs, to accommodate the added dimensions of flexible sheath (16) covering the counter barbs.

At least one of first barbs (26) or second barbs (30) may extend helically along path (15). In other words, at least one of first barbs (26) or second barbs (30) may be arranged in a helical pattern along the circumference of flexible suture (14). In some versions, at least one of first barbs (26) or second barbs (30) may be symmetric along path (15). As shown, first barbs (26) are helical along path (15) and second barbs (30) are symmetric along path (15). However, it is also envisioned that first barbs (26) are symmetric along path (15) and second barbs (30) are helical along path (15), or first and second barbs (26, 30) are each symmetric, or first and second barbs (26, 30) are each helical (e.g., first and second barbs (126, 130) shown in FIGS. 3-4).

As shown, flexible suture (14) includes an optional elastic intermediate portion (38) that is configured to stretch to aid in setting flexible suture (14). Elastic intermediate portion (38) is disposed between second and first portions (22, 24). Elastic intermediate portion (38) may be formed by thermally treating elastic intermediate portion (38) or by interposing an elastic section between first and second portions (22, 24), so that elastic intermediate portion (38) is formed from a different material. Flexible suture (14) defines a circumference.

Flexible suture (14) may be formed from a non-degradable material or a bioabsorbable materials (e.g., a bioabsorbable polymers). A non-degradable suture (also referred to as "non-absorbable suture") refers to a suture comprising material that is not degraded by chain scission such as chemical reaction processes (e.g., hydrolysis, oxidation/reduction, enzymatic mechanisms or a combination of these) or by a thermal or photolytic process. Non-degradable suture material includes polyamide (also known as nylon, such as nylon 6 and nylon 6,6), polyester (e.g., polyethylene terephthalate), polytetrafluoroethylene (e.g., expanded polytetrafluoroethylene), polyether-ester such as polybutester (block copolymer of butylene terephthalate and polytetra methylene ether glycol), polyurethane, metal alloys, metal (e.g., stainless steel wire), polypropylene, polyethylene, silk, and cotton. A flexible suture (14) made of non-degradable suture material is suitable for applications in which flexible suture (14) is meant to remain permanently within tissue (T) or is meant to be physically removed from the body.

A bioabsorbable suture (also referred to as "non-absorbable suture") refers to a suture comprising material that degrades within the body. Bioabsorbable polymers and medical devices made from such polymers are known in the art. Conventional bioabsorbable polymers include polylactic acid, poly(Thdioxanone), polyglycolic acid, copolymers of lactide, glycolide, p-dioxanone, trimethylene carbonate, 8-caprolactone, in various combinations, etc. The bioabsorbable polymers are designed to have a chemistry such that the polymers breakdown in vivo and are either metabolized or otherwise broken down, for example by hydrolysis, and excreted from the patient's body.

Flexible sheath (16) includes a generally tubular wall (40) that defines an inner surface (42) and an outer surface (42). Inner surface (42) defines a lumen. Flexible sheath (16) is configured to prevent one of first or second tips (28, 32) that extend in insertion direction (34) from contacting tissue (T) as flexible sheath (16) is being advanced in insertion direction (34). Flexible sheath (16) covers at least a portion of one of first barbs (26) or second barbs (30) without covering any portion of the other of first barbs (26) or second barbs (30). As shown, flexible sheath (16) covers second barbs (30) without covering any portion of first barbs (26). In some versions, flexible sheath (16) is heat shrinkable, so that flexible sheath (16) may be heat shrunk over second barbs (30) but not first tips (28). In some versions, flexible sheath (16) may be heat shrunk over first tips (28) but not second tips (32). While not shown, flexible sheath (16) may have a thicker portion that is not covering second barbs (30). In some versions, flexible sheath (16) may made from a material having lubricious properties, such as made of polytetrafluoroethylene (PTFE), or any other low friction material. In some versions, outer surface (42) of flexible sheath (16) may include a coating (e.g., such as a silicone coating) and/or a liquid lubricant.

The flexibility of flexible sheath (16) is greater than the flexibility of needle (12). Flexible sheath (16) includes a pull tab (46) configured to be manually grasped by a user. Pull tab (46) may function as an anchor feature preventing flexible suture (14) from being further advanced in insertion direction (34). Pull tab (46) may be grasped by the user when removing flexible sheath (16) in counter insertion direction (36). As shown in FIGS. 1-2C, flexible sheath (16) is not directly coupled with needle (12). Flexible sheath (16) has a first end (48) that is spaced a distance from second end (20) of needle (12). Outer circumference of flexible sheath (16) corresponds to a sheath diameter (d3). In some versions, sheath diameter (d3) is between about 100% and about 150% of needle diameter (d1). In other versions, sheath diameter (d3) is less needle diameter (d1).

The installation of single-armed suture assembly (10) is described below with reference to FIGS. 2A-2C. Particularly, FIG. 2A shows single-armed suture assembly (10) after being advanced through tissue (T) in insertion direction (34) with flexible sheath (16) covering second barbs (30) of flexible suture (14). First tips (28) extend in counter insertion direction (36) and are configured to contact tissue (T) as flexible suture (14) is advanced in insertion direction (34). First tips (28) extending in counter insertion direction (36) means that first tips (28) may deflect toward counter insertion direction (36) as flexible suture (14) is advanced in insertion direction (34). Flexible suture (14) may be installed by pulling needle (12) so that flexible suture (14) follows through tissue (T) in the path defined by needle (12). Due to flexible sheath (16) covering each second tip (32) of second barbs (30), second barbs (30) do not provide resistance against flexible suture (14) moving behind needle (12) during insertion or implantation.

FIG. 2B shows single-armed suture assembly (10) of FIG. 2A, as flexible sheath (16) is being actively removed in counter insertion direction (36) to expose the previously covered second barbs (30). After flexible suture (14) is positioned at the desired location, flexible sheath (16) is removed by pulling flexible sheath (16) off of second portion (24), thus uncovering second barbs (30) to allow for second barbs (30) to engage tissue (T). For example, upon positioning flexible suture (14), flexible sheath (16) (which may also be referred to a compression sleeve) is pulled from second barbs (30) by pulling on pull tab (46), exposing and releasing second barbs (30) and allowing second barbs (30) to deploy in tissue (T) and engage tissue (T). FIG. 2C shows single-armed suture assembly (10) of FIG. 2A, but with first and second cut portions (50, 52) being removed after second barbs (30) are deployed. As shown, first cut portion (50) is coupled with needle (12).

B. Second Example of a Single-Armed Suture Assembly

Figure 3:
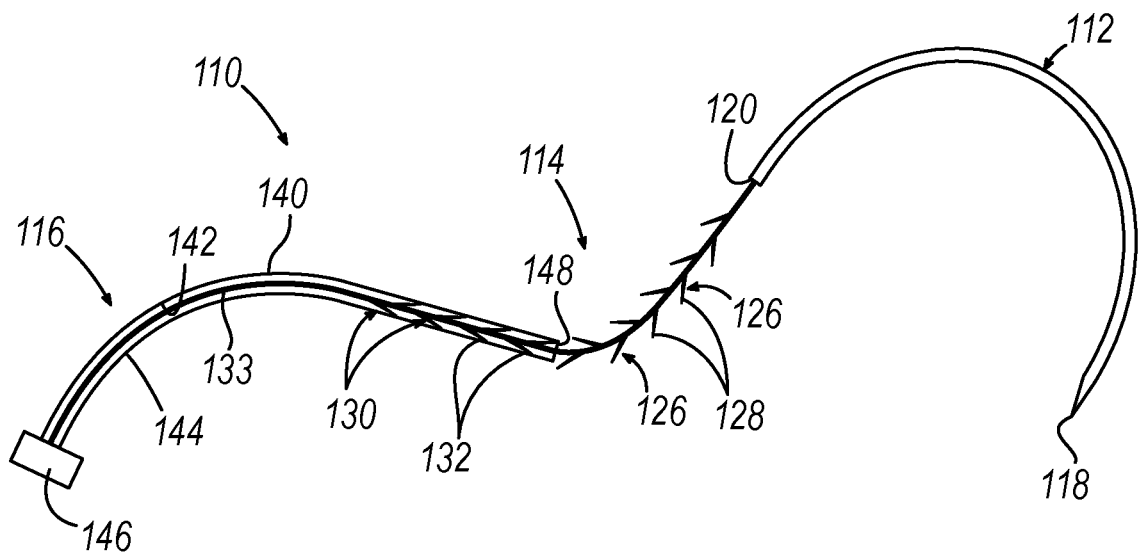
FIG. 3 depicts a side elevational view of a second example of a single-armed suture assembly including helical barbs.
Figure 4:
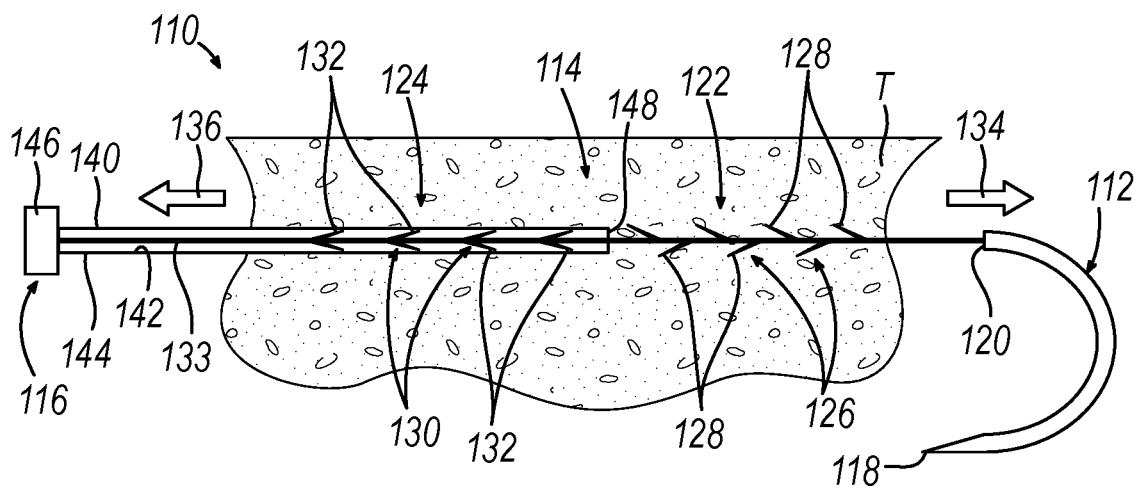
FIG. 4 depicts a side elevational view of the single-armed suture assembly of FIG. 3 after being advanced through tissue in an insertion direction with a flexible sheath covering select barbs of the flexible suture.

FIGS. 3-4 show a second example of a single-armed suture assembly (110). As shown, single-armed suture assembly (110) includes a needle (112), a flexible suture (114), and a flexible sheath (116). Needle (112) is similar to needle (12), flexible suture (114) is similar to flexible suture (14), and flexible sheath (116) is similar to flexible sheath (16), except as otherwise described below.

Similar to needle (12), needle (112) includes first and second ends (118, 120). Flexible suture (114) includes first and second portions (122, 124), with first portion (122) including a plurality of first barbs (126) having first tips (128). Second portion (124) includes a plurality of second barbs (130) having second tips (132) and a barbless portion (133) that does not include barbs. First tips (128) extend in a counter insertion direction (136), and second tips (132) extend in an insertion direction (134). First and second barbs (126, 130) include helical barbs. Flexible suture (114) is longer than flexible suture (14) due to barbless portion (133).

Similar to flexible sheath (16), flexible sheath (116) includes a generally tubular wall (140) defining inner and outer surfaces (142, 144) and a pull tab (146). As shown, flexible sheath (116) is longer than flexible sheath (16), so that a distance between a first end (148) of flexible sheath (116) and pull tab (146) of flexible sheath (116) is greater than the corresponding distance for flexible sheath (16). FIG. 4 shows single-armed suture assembly (110) of FIG. 3 after being advanced through tissue (T) in insertion direction (134) with flexible sheath (116) covering second barbs (130) of flexible suture (114). Flexible sheath (116) may be removed in counter insertion direction (136) using pull tab (146) to expose second barbs (130).

C. Third Example of a Single-Armed Suture Assembly

Figure 5:
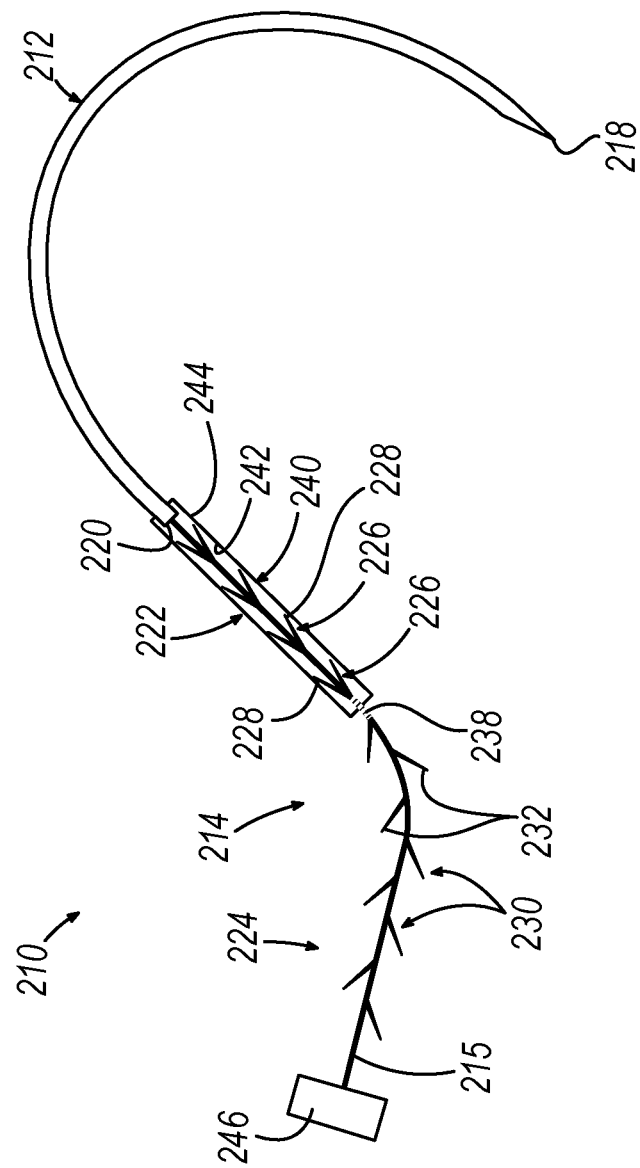
FIG. 5 depicts a side elevational view of a third example of a single-armed suture assembly that includes a flexible sheath coupled with a needle.
Figure 6A:
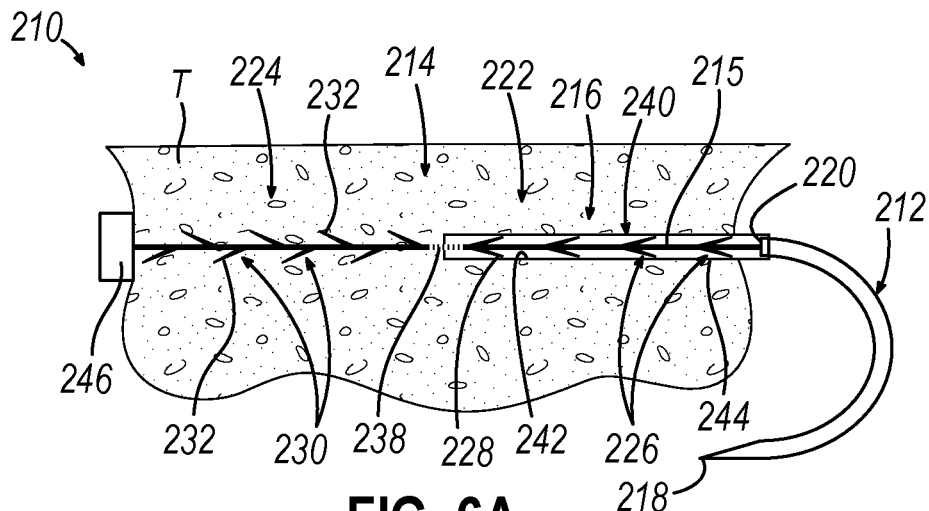
FIG. 6A depicts a side elevational view of the single-armed suture assembly of FIG. 5 after being advanced through tissue in an insertion direction with a flexible sheath covering select barbs of the flexible suture.
Figure 6B:
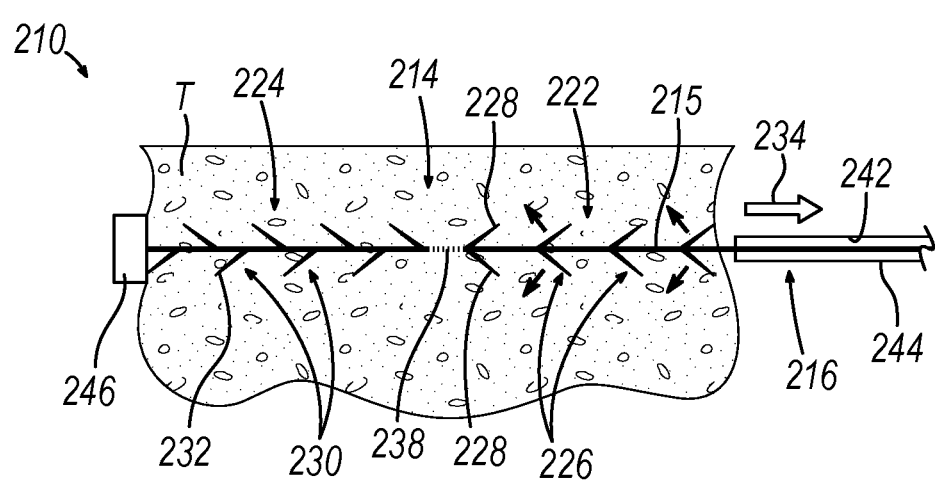
FIG. 6B depicts a side elevational view of the single-armed suture assembly of FIG. 6A, but with the flexible sheath being removed in the insertion direction to expose the select barbs.
Figure 6C:
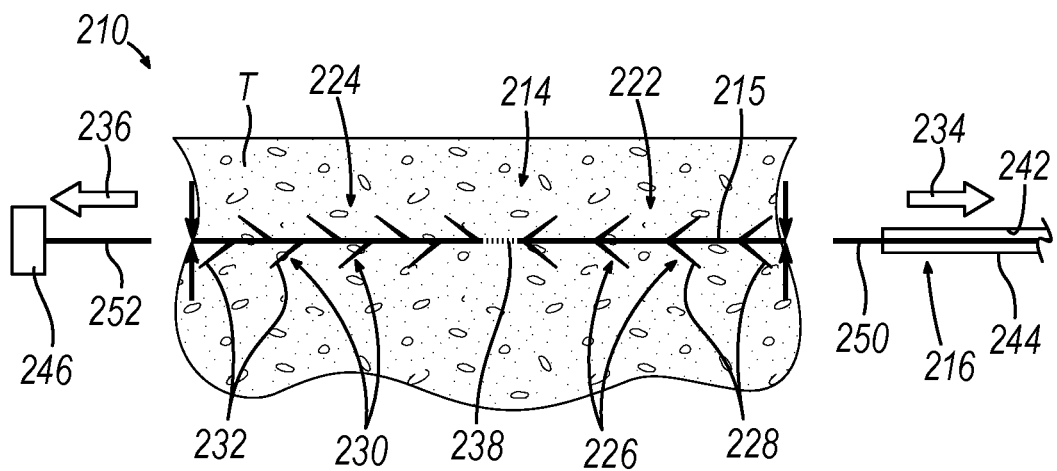
FIG. 6C depicts a side elevational view of the single-armed suture assembly of FIG. 6B, but with cut portions of the flexible suture being removed.

FIGS. 5-6C show a third example of a single-armed suture assembly (210). As shown, single-armed suture assembly (210) includes a needle (212), a flexible suture (214), and a flexible sheath (216). Needle (212) is similar to needle (12), flexible suture (214) is similar to flexible suture (14), and flexible sheath (216) is similar to flexible sheath (16), except as otherwise described below.

Similar to needle (12), needle (212) includes first and second ends (218, 220). Flexible suture (214) includes first and second portions (222, 224), with first portion (222) including a plurality of first barbs (226) having first tips (228). Second portion (224) includes a plurality of second barbs (230) having second tips (232). Unlike first tips (28, 128) described above, first tips (228) extend away from path (215) in an insertion direction (134). Unlike second tips (32, 132) described above, second tips (232) extend away from path (215) in a counter insertion direction (236). First barbs (226) include symmetric barbs that extend symmetrically away from a path (215), and second barbs (226) include helical barbs that extend helically away from path (215). Flexible suture (214) includes an optional elastic intermediate portion (238) similar to optional elastic intermediate portion (38).

Similar to flexible sheath (16), flexible sheath (216) includes a generally tubular wall (240) defining inner and outer surfaces (242, 244) and a pull tab (246). However, unlike flexible sheaths (16, 116) described above, flexible sheath (216) is coupled with needle (212). As shown, a first end (248) of flexible sheath (216) overlaps with second end (220) of needle (212). In some versions, needle (212) and flexible sheath (216) may include corresponding locking features to securably couple needle (212) with flexible sheath (216). Flexible sheath (216) is removed in insertion direction (234) to expose first barbs (226).

The installation of single-armed suture assembly (210) is described below with reference to FIGS. 6A-6C. Particularly, FIG. 6A shows single-armed suture assembly (210) of FIG. 5 after being advanced through tissue (T) in insertion direction (234) with flexible sheath (216) covering first barbs (226) of flexible suture (214) but with second barbs (230) of flexible suture (214) exposed and contacting tissue (T).

FIG. 6B shows single-armed suture assembly (210) of FIG. 6A, but with flexible sheath (216) being removed in insertion direction (234) to expose first barbs (226). After flexible suture (214) is installed by pulling flexible suture (214) behind needle (212) through tissue (T), flexible sheath (216) is removed. Flexible sheath (216) may be removed pulling needle (212) that is coupled with flexible sheath (216) to uncover first barbs (226) and engage first barbs (226) with tissue (T). FIG. 6C shows single-armed suture assembly (210) of FIG. 6B, but with first and second cut portions (250, 252) being removed. First cut portion (250) is coupled with needle (212) and flexible sheath (216), and second cut portion (252) is coupled with pull tab (246).

D. Fourth Example of a Single-Armed Suture Assembly

Figure 7:
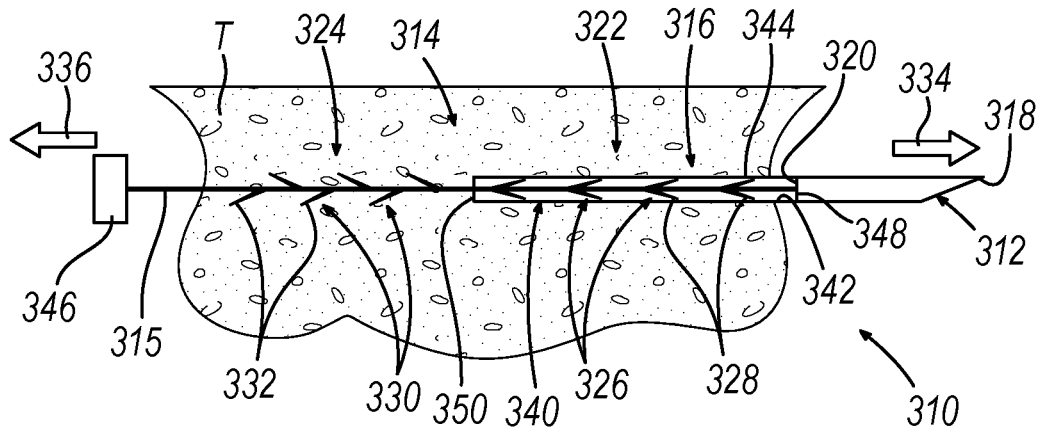
FIG. 7 depicts a side elevational view of a fourth example of a single-armed suture assembly.

FIG. 7 shows a fourth example of a single-armed suture assembly (310). As shown, single-armed suture assembly (310) includes a needle (312), a flexible suture (314), and a flexible sheath (316). Needle (312) is similar to needle (12), flexible suture (314) is similar to flexible suture (14), and flexible sheath (316) is similar to flexible sheath (16), except as otherwise described below.

Similar to needle (12), needle (312) includes first and second ends (318, 320). Unlike needles (12, 112, 212), needle (312) is shown as a straight needle extending longitudinally. Flexible suture (314) includes first and second portions (322, 324), with first portion (322) including a plurality of first barbs (326) having first tips (328). Similar to first tips (228), first tips (328) each extend away from path (315) in insertion direction (334). Second portion (324) includes a plurality of second barbs (330) having second tips (332). Similar to second tips (232), second tips (332) each extend away from path (315) in counter insertion direction (336). First barbs (326) include symmetric barbs that extend symmetrically away from a path (315), and second barbs (326) include helical barbs that extend helically away from path (315).

Similar to flexible sheath (16), flexible sheath (316) includes a generally tubular wall (340) defining inner and outer surfaces (342, 344). A pull tab (346) may be positioned at an end of flexible suture (314). Flexible sheath (316) includes first and second ends (348, 350). As shown, first end (348) of flexible sheath (316) is coupled with needle (312). Unlike flexible sheath (216) that overlaps with needle (212) in FIG. 5, flexible sheath (316) terminates at needle (312) at a butt joint. FIG. 7 shows single-armed suture assembly (310) after being advanced through tissue (T) in insertion direction (334) with flexible sheath (316) covering first barbs (326) of flexible suture (314). First barbs (326) may be deployed in a similar manner to first barbs (226) shown in FIG. 6B. Flexible suture (314) may be trimmed similar to first and second cut portions (250, 252) shown in FIG. 6C.

E. Fifth Example of a Single-Armed Suture Assembly

Figure 8:
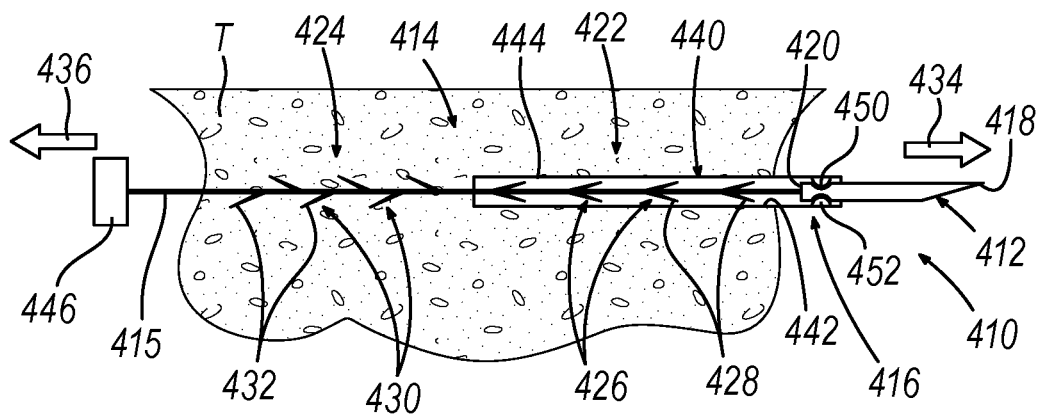
FIG. 8 depicts a side elevational view of a fifth example of a single-armed suture assembly.

FIG. 8 shows a fifth example of a single-armed suture assembly (410). As shown, single-armed suture assembly (410) includes a needle (412), a flexible suture (414), and a flexible sheath (416). Needle (412) is similar to needle (12), flexible suture (414) is similar to flexible suture (14), and flexible sheath (416) is similar to flexible sheath (16), except as otherwise described below.

Similar to needle (312), needle (412) is shown as a straight needle. Similar to needle (12), needle (412) includes first and second ends (418, 420). Needle (412) includes at least one recessed portion (450) that taperers inwardly, with two recessed portions (450) being shown. Recessed portion (450) may include a detent, an indent, or another suitable structure for engaging flexible sheath (416).

Flexible suture (414) includes first and second portions (422, 424), with first portion (422) including a plurality of first barbs (426) having first tips (428). Second portion (424) includes a plurality of second barbs (430) having second tips (432). First tips (428) each extend away from path (415) in insertion direction (434). Second tips (432) each extend away from path (415) in counter insertion direction (436). First barbs (426) include symmetric barbs that extend symmetrically away from a path (415), and second barbs (426) include helical barbs that extend helically away from path (415). As shown, single-armed suture assembly (410) is already advanced through tissue (T) in an insertion direction (434) with flexible sheath (416) covering first barbs (426) of flexible suture (414) while allowing second barbs (430) to remain exposed during insertion.

Similar to flexible sheath (16), flexible sheath (416) includes a generally tubular wall (440) defining inner and outer surfaces (442, 444). A pull tab (446) may be positioned at an opposite end of flexible suture (414) relative to needle (412). As shown, flexible sheath (416) is coupled with needle (412). Flexible sheath (416) includes at least one projection (452). Projection (452) of flexible sheath (416) is configured to engage recessed portion (450) of needle (412). First barbs (426) may be deployed in a similar manner to first barbs (226) shown in FIG. 6B. Flexible suture (414) may be trimmed similar to first and second cut portions (250, 252) shown in FIG. 6C.

F. Sixth Example of a Single-Armed Suture Assembly

Figure 9A:
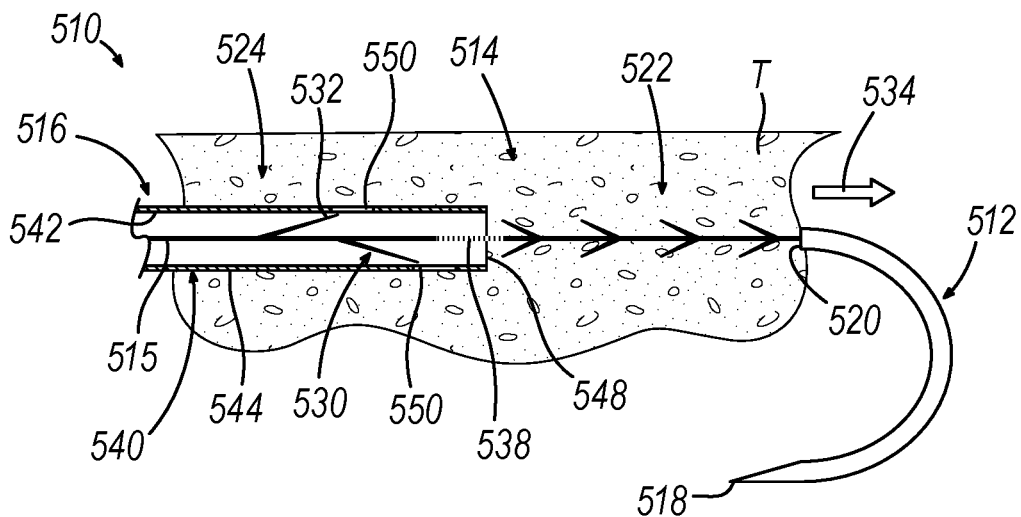
FIG. 9A depicts a side elevational view of a sixth example of a single-armed suture assembly advanced through tissue in an insertion direction with a flexible sheath covering select barbs of the flexible suture.
Figure 9B:
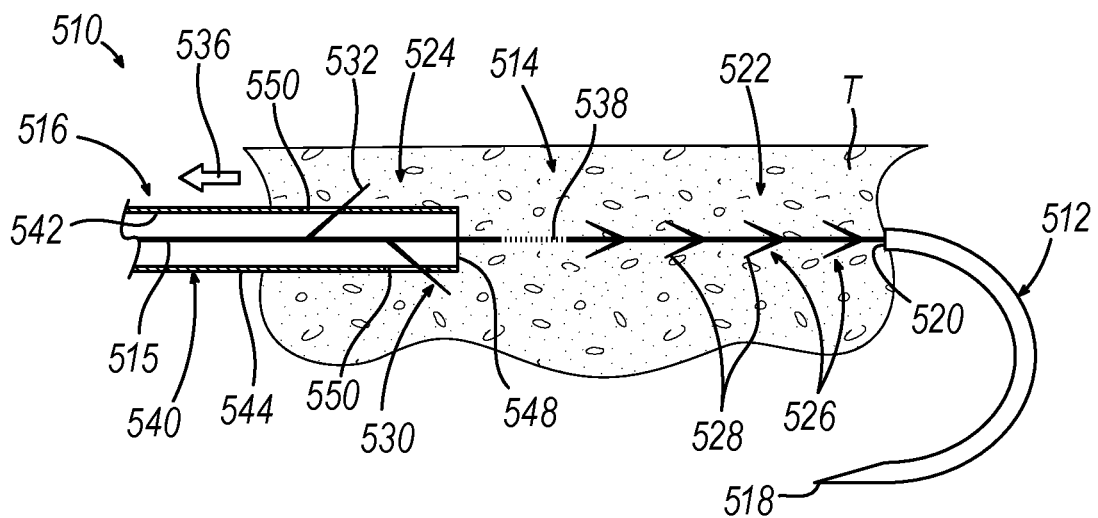
FIG. 9B depicts a side elevational view of the single-armed suture assembly of FIG. 9A, but with the flexible sheath being moved in a counter insertion direction to expose the select barbs through openings in the flexible sheath.

FIGS. 9A-9B show a sixth example of a single-armed suture assembly (510). As shown, single-armed suture assembly (510) includes a needle (512), a flexible suture (514), and a flexible sheath (516). Needle (512) is similar to needle (12), flexible suture (514) is similar to flexible suture (14), and flexible sheath (516) is similar to flexible sheath (16), except as otherwise described below.

Similar to needle (12), needle (512) includes first and second ends (518, 520). Flexible suture (514) includes first and second portions (522, 524), with first portion (522) including a plurality of first barbs (526) having first tips (528). Second portion (524) includes a plurality of second barbs (530). First tips (528) extend in a counter insertion direction (536), and second tips (532) extend in an insertion direction (534). First barbs (526) are symmetric along a path (515), and second barbs (526) include helical barbs.

Similar to flexible sheath (16), flexible sheath (516) includes a generally tubular wall (540) defining inner and outer surfaces (542, 544). Flexible sheath (516) may be bioabsorbable, so that flexible sheath (516) is not removed, but is rather retained within (T). For example, flexible suture (514) may be non-degradable, and flexible sheath (516) may be bioabsorbable. In other versions, both flexible suture (514) and flexible sheath (516) are bioabsorbable at the same or different bioabsorbable rate. As shown, flexible sheath (514) includes an optional elastic intermediate portion (538) similar to elastic intermediate portion (38).

FIG. 9A shows single-armed suture assembly (510) after being advanced through tissue (T) in insertion direction (534) with flexible sheath (516) covering second barbs (530) of flexible suture (514). In other words, second barbs (530) are protected during deployment by flexible sheath (516). Flexible sheath (516) may be pulled in a counter insertion direction (136) to expose second barbs (530) through openings of flexible sheath (516). Alternatively, flexible sheath (516) may include slots opening toward a first end (548) of flexible sheath (516) to allow for flexible sheath (516) to be removed. In some versions, flexible sheath (516) may be rotated to expose second barbs (530).

FIG. 9B shows single-armed suture assembly (510) of FIG. 9A, but with flexible sheath (516) being moved in counter insertion direction (536) to expose second barbs (530) through openings (550) of flexible sheath (516). In other words, flexible sheath (516) is pulled back to deploy the counter-barbs through openings (550). Openings (550) may be arranged at a variety of different angles around the circumference of flexible sheath (516). While two openings (550) are shown in FIGS. 9A-9B, additional openings (550) are also envisioned. While flexible sheath (516) is shown as being retracted in counter insertion direction (536), it is also envisioned that needle (512) may be further advanced in insertion direction (534).

G. Example of a Method

Figure 10:
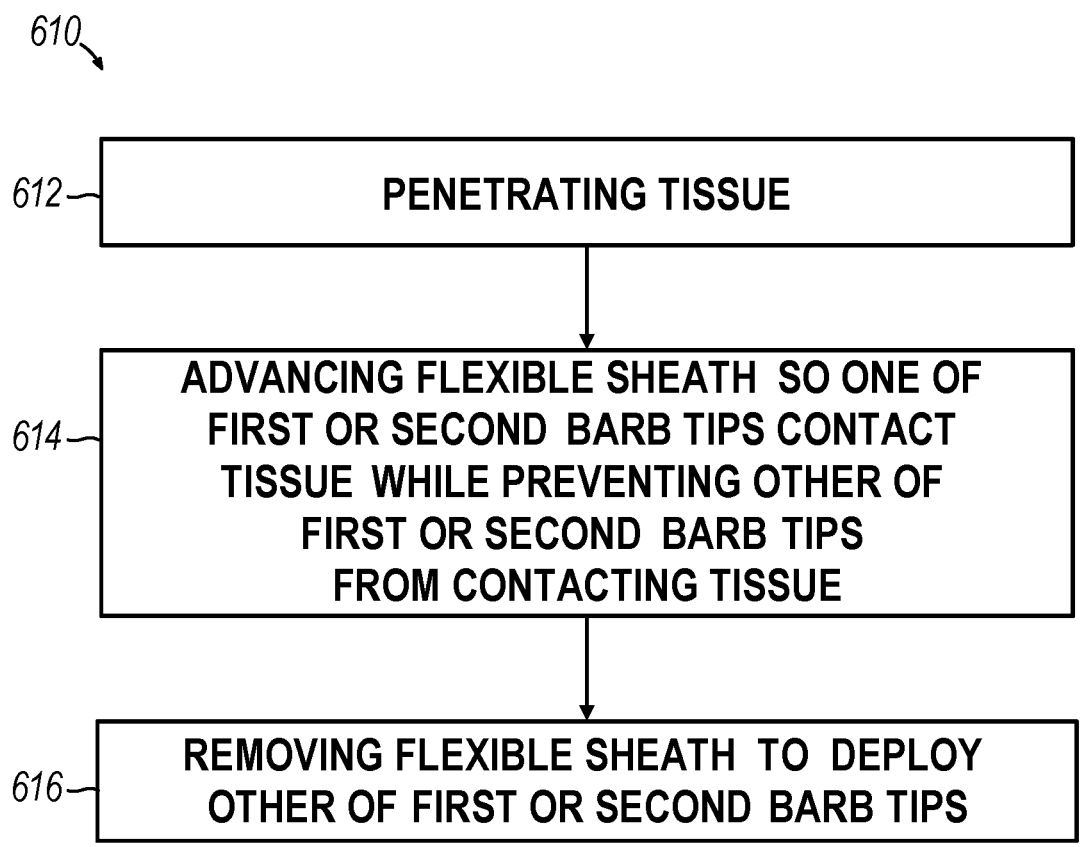
FIG. 10 depicts a flowchart of an example of a method of using the single-armed suture assemblies of FIGS. 1-9B.

FIG. 10 shows a flowchart of an exemplary method (610) of using single-armed suture assemblies (10, 110, 210, 310, 410, 510) of FIGS. 1-9B. At step (612), method (610) includes penetrating tissue (T) along insertion direction (34, 134, 234, 334, 434, 534) using needle (12, 112, 212, 312, 412, 512). Single-armed suture assemblies (10, 110, 210, 310, 410, 510) may be used in a variety of surgical procedures. In some versions, single-armed suture assemblies (10, 110, 210, 310, 410, 510) may be used for cosmetic lift procedures for the brow, face, and neck regions. These cosmetic lift procedures may be similar to those shown and described in U.S. Pat. No. 10,548,592, entitled "Suture Methods and Devices," issued Feb. 2, 2020, the disclosure of which is incorporated by reference herein, in its entirety.

At step (614), method (610) includes advancing flexible suture (14, 114, 214, 314, 414, 514) so that one of first tips (28, 128, 528) or second tips (232, 332, 432) that extend in counter insertion direction (36, 136, 236, 336, 436, 536) contact tissue (T) while preventing the other of first tips (228, 328, 428) or second tips (32, 132, 532) that extend in insertion direction (34, 134, 234, 334, 434, 534) from contacting tissue (T) using flexible sheath (16, 116, 216, 316, 416, 516). Flexible flexible sheath (16, 116, 216, 316, 416, 516) may be advanced using needle (12, 112, 212, 312, 412, 512) and/or flexible suture (14, 114, 214, 314, 414, 514).

At step (616), method (610) includes removing flexible sheath (16, 116, 216, 316, 416, 516) to deploy first tips (228, 328, 428) or second tips (32, 132, 532) that extend in insertion direction (34, 134, 234, 334, 434, 534) into tissue (T). In other words, first tips (228, 328, 428) or second tips (32, 132, 532) that extend in insertion direction (34, 134, 234, 334, 434, 534) are deployed into tissue after first tips (28, 128, 528) or second tips (232, 332, 432) that extend in counter insertion direction (36, 136, 236, 336, 436, 536).

II. Examples of Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A single-armed suture assembly comprising: (a) a needle that includes first and second ends, wherein the second end is configured to advance through tissue in an insertion direction; (b) a flexible suture coupled with the second end of the needle, wherein the flexible suture extends along a longitudinal path, the flexible suture comprising: (i) a first portion that includes a plurality of first barbs having first tips extending away from the longitudinal path in either the insertion direction or in a counter insertion direction that is opposite to the insertion direction, and (ii) a second portion that includes a plurality of second barbs having second tips extending opposite to the first tips in the other of the insertion direction or the counter insertion direction; and (c) a flexible sheath configured to prevent one of the first or second tips that extend in the insertion direction from contacting tissue as the flexible sheath is being advanced in the insertion direction, wherein the other of the first or second tips that extend in the counter insertion direction is configured to contact tissue as the flexible sheath is being advanced in the insertion direction.

Example 2

The single-armed suture assembly of Example 1, wherein the flexibility of the flexible sheath is greater than the flexibility of the needle.

Example 3

The single-armed suture assembly of any of Examples 1 through 2, wherein at least one of the plurality of first barbs or the plurality the second barbs extend helically along the longitudinal path.

Example 4

The single-armed suture assembly of any of Examples 1 through 3, wherein at least one of the plurality of first barbs or the plurality the second barbs are symmetric along to the longitudinal path.

Example 5

The single-armed suture assembly of any of Examples 1 through 4, wherein the flexible sheath includes a pull tab configured to be manually grasped by a user.

Example 6

The single-armed suture assembly of any of Examples 1 through 5, wherein the needle is a curved needle.

Example 7

The single-armed suture assembly of any of Examples 1 through 6, wherein the single-armed flexible suture further comprises an elastic intermediate portion configured to stretch to aid in setting the flexible suture, wherein the elastic intermediate portion is disposed between the second and first portions.

Example 8

The single-armed suture assembly of any of Examples 1 through 7, wherein the flexible sheath covers at least a portion of one of the plurality of first barbs or the plurality of second barbs without covering any portion of the other of the plurality of first barbs or the plurality of second barbs.

Example 9

The single-armed suture assembly of any of Examples 1 through 8, wherein the outer circumference of the flexible sheath defines a sheath diameter, wherein the outer circumference of the needle defines a needle diameter, wherein the sheath diameter is between about 100% and about 150% of the needle diameter.

Example 10

The single-armed suture assembly of any of Examples 1 through 9, wherein the first tips each extend away from the longitudinal path in the counter insertion direction, wherein the second tips each extend away from the longitudinal path in the insertion direction.

Example 11

The single-armed suture assembly of any of Examples 10 through 12, wherein the flexible sheath is heat shrunk over the first tips but not the second tips.

Example 12

The single-armed suture assembly of any of Examples 1 through 11, wherein the flexible sheath has a first end that is spaced a distance from the second end of the needle.

Example 13

The single-armed suture assembly of any of Examples 1 through 12, wherein the flexible sheath is not directly coupled with the needle.

Example 14

The single-armed suture assembly of any of Examples 1 through 13, wherein the flexible sheath includes an outer surface, wherein the outer surface includes a lubricious coating configured to decrease friction between the outer surface and the tissue.

Example 15

The single-armed suture assembly of any of Examples 1 through 9 and Examples 12 through 14, wherein the first tips each extend away from the longitudinal path in the insertion direction, wherein the second tips each extend away from the longitudinal path in the counter insertion direction.

Example 16

The single-armed suture assembly of any of Examples 1 through 15, wherein flexible sheath is directly coupled with the needle.

Example 17

The single-armed suture assembly of any of Examples 1 through 16, wherein the flexible sheath includes a projection, wherein the needle includes a recessed portion configured to engage the projection of flexible sheath.

Example 18

A single-armed suture assembly comprising: (a) a needle; (b) a flexible suture coupled with the needle, wherein the flexible suture extends along a longitudinal path, the flexible suture comprising: (i) a first portion that includes a plurality of first barbs having first tips extending away from the longitudinal path in a second direction, and (ii) a second portion that includes a plurality a second barbs having second tips extending opposite to the first tips in a first direction; and (c) a flexible sheath configured to prevent the second tips from contacting tissue while allowing the first tips that extend in the second direction to contact tissue as the flexible sheath is being advanced in the first direction.

Example 19

The single-armed suture assembly of Example 18, wherein the flexible sheath has a first end that is spaced a distance from the needle.

Example 20

The single-armed suture assembly of any of Examples 18 through 19, wherein the flexible suture has a circumference, wherein at least one of the plurality of first barbs or the plurality second barbs are arranged in a helical pattern along the circumference of the flexible suture.

Example 21

A method of using a single-armed suture assembly, the single-armed suture assembly comprising: (a) a needle that includes first and second ends, wherein the second end is configured to advance through tissue in an insertion direction, (b) a flexible suture coupled with the second end of the needle, wherein the flexible suture body extends along a longitudinal path, the flexible suture comprising: (i) a first portion that includes a plurality of first barbs having first tips extending away from the longitudinal path in either the insertion direction or in a counter insertion direction that is opposite to the insertion direction, and (ii) a second portion that includes a plurality of second barbs having second tips extending opposite to the first tips in the other of the insertion direction or the counter insertion direction, and (c) a flexible sheath, the method comprising: (a) penetrating tissue along an insertion direction using the needle; and (b) advancing the flexible suture in the insertion direction so that one of the first or second tips that extend in the counter insertion direction contacts the tissue while preventing the other of the first or second tips that extends in the insertion direction from contacting tissue using the flexible sheath.

Example 22

The method of Example 21, further comprising removing the flexible sheath to deploy the first or second tips that extend in the insertion direction into the tissue.

III. Miscellaneous

It is understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A single-armed suture assembly comprising:
   (a) a needle configured to advance through tissue in an insertion direction;
   (b) a flexible suture coupled with the needle, wherein the flexible suture extends along a longitudinal path, the flexible suture comprising:
      (i) a first portion that includes a plurality of first barbs having first tips extending away from the longitudinal path in either the insertion direction or in a counter insertion direction that is opposite to the insertion direction, and
      (ii) a second portion that includes a plurality of second barbs having second tips extending away from the longitudinal path in the other of the insertion direction or the counter insertion direction; and
   (c) a flexible sheath that covers the second tips and has a length that is no greater than a length of the second portion such that the flexible sheath is configured to prevent the second tips from contacting tissue while allowing the first tips to contact tissue as the flexible sheath and the flexible suture are advanced together in the insertion direction.

2. The single-armed suture assembly of claim 1, wherein the flexibility of the flexible sheath is greater than the flexibility of the needle.

3. The single-armed suture assembly of claim 1, wherein at least one of the plurality of first barbs or the plurality of second barbs extends helically along the longitudinal path.

4. The single-armed suture assembly of claim 1, wherein at least one of the plurality of first barbs or the plurality of second barbs is symmetric about the longitudinal path.

5. The single-armed suture assembly of claim 1, wherein the flexible sheath includes a pull tab configured to be manually grasped by a user.

6. The single-armed suture assembly of claim 1, wherein the flexible suture further comprises an elastic intermediate portion configured to stretch to aid in setting the flexible suture, wherein the elastic intermediate portion is disposed between the second and first portions.

7. The single-armed suture assembly of claim 1, wherein an outer circumference of the flexible sheath defines a sheath diameter, wherein an outer circumference of the needle defines a needle diameter, wherein the sheath diameter is between about 100% and about 150% of the needle diameter.

8. The single-armed suture assembly of claim 1, wherein the first tips each extend away from the longitudinal path in the counter insertion direction, wherein the second tips each extend away from the longitudinal path in the insertion direction.

9. The single-armed suture assembly of claim 8, wherein the flexible sheath is not directly coupled with the needle as the flexible sheath and the flexible suture are advanced together in the insertion direction.

10. The single-armed suture assembly of claim 8, wherein the flexible sheath has a first end that is spaced a distance from an end of the needle as the flexible sheath and the flexible suture are advanced together in the insertion direction.

11. The single-armed suture assembly of claim 8, wherein the flexible sheath is heat shrunk over the second tips but not the first tips.

12. The single-armed suture assembly of claim 1, wherein the first tips each extend away from the longitudinal path in the insertion direction, wherein the second tips each extend away from the longitudinal path in the counter insertion direction.

13. The single-armed suture assembly of claim 12, wherein the flexible sheath is directly coupled with the needle as the flexible sheath and the flexible suture are advanced together in the insertion direction.

14. The single-armed suture assembly of claim 1, wherein the flexible sheath includes a projection spaced a distance from a distal end of the sheath, wherein the needle includes a recessed portion spaced a distance from a proximal end of the needle configured to engage the projection of flexible sheath.

15. The single-armed suture assembly of claim 1, wherein the flexible sheath has opposed ends that approximately align with opposed ends of the second portion such.

16. The single-armed suture assembly of claim 15, wherein the flexible sheath has a first end that is spaced a distance from the needle as the flexible sheath and the flexible suture are advanced in the first direction.

17. The single-armed suture assembly of claim 15, wherein the flexible suture has a circumference, wherein at least one of the plurality of first barbs or the plurality of second barbs is arranged in a helical pattern along the circumference of the flexible suture.

18. The single-armed suture assembly of claim 1, wherein the flexible sheath has a length approximately equal to a length of the second portion of the flexible suture.

19. A single-armed suture assembly comprising:
  (a) a needle;
  (b) a flexible suture coupled with the needle, wherein the flexible suture extends along a longitudinal path, the flexible suture comprising:
    (i) a first portion that includes a plurality of first barbs having first tips extending away from the longitudinal path in a second direction, and
    ii a second portion that includes a plurality of second barbs having second tips extending opposite to the first tips in a first direction, wherein the plurality of first barbs having the first tips are positioned closer to the needle than the plurality of second barbs having the second tips; and
  (c) a flexible sheath having a length approximately equal to a length of the second portion such that the flexible sheath is configured to prevent the second tips from contacting tissue while allowing the first tips that extend in the second direction to contact tissue as the flexible sheath and the flexible suture are advanced together in the first direction.

20. The single-armed suture assembly of claim 19, wherein the second tips are configured to be concealed within the flexible sheath as the flexible sheath and the flexible suture are advanced in the first direction.

* * * * *